US011886073B2

(12) United States Patent
Lee et al.

(10) Patent No.: US 11,886,073 B2
(45) Date of Patent: *Jan. 30, 2024

(54) NANOSTRUCTURE BASED DISPLAY DEVICES

(71) Applicant: Shoei Chemical Inc., Tokyo (JP)

(72) Inventors: Ernest Chung-Wei Lee, Palo Alto, CA (US); Charles Hotz, San Rafael, CA (US)

(73) Assignee: SHOEI CHEMICAL INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,404

(22) Filed: Nov. 21, 2022

(65) Prior Publication Data

US 2023/0161193 A1 May 25, 2023

Related U.S. Application Data

(63) Continuation of application No. 16/540,541, filed on Aug. 14, 2019, now Pat. No. 11,506,929.

(60) Provisional application No. 62/764,773, filed on Aug. 16, 2018.

(51) Int. Cl.
  *G02F 1/13357* (2006.01)
  *G02F 1/1335* (2006.01)

(52) U.S. Cl.
  CPC .. *G02F 1/133603* (2013.01); *G02F 1/133504* (2013.01); *G02F 1/133509* (2013.01); *G02F 1/133528* (2013.01); *G02F 2202/36* (2013.01)

(58) Field of Classification Search
  CPC ......... G02F 1/133603; G02F 1/133504; G02F 1/133509; G02F 2202/36
  See application file for complete search history.

(56) References Cited

U.S. PATENT DOCUMENTS

| | | | |
|---|---|---|---|
| 2018/0113341 A1* | 4/2018 | Lee | G02B 5/02 |
| 2018/0202616 A1* | 7/2018 | Yoon | H01L 33/50 |
| 2019/0243188 A1 | 8/2019 | Yoon et al. | |
| 2019/0296088 A1* | 9/2019 | Kim | H10K 59/12 |

OTHER PUBLICATIONS

United States Non-Final office action dated Oct. 13, 2021 for U.S. Appl. No. 16/540,541.

\* cited by examiner

*Primary Examiner* — James A Dudek
(74) *Attorney, Agent, or Firm* — Alleman Hall Creasman & Tuttle LLP

(57) ABSTRACT

Embodiments of a display device are described. A display device includes a backlight unit having a light source and a liquid crystal display (LCD) module. The light source is configured to emit a primary light having a first peak wavelength. The LCD module includes a first sub-pixel having a phosphor film and a second sub-pixel having a non-phosphor film. The phosphor film is configured to receive a first portion of the primary light and to convert the first portion of the primary light to emit a secondary light having a second peak wavelength that is different from the first peak wavelength. The non-phosphor film is configured to receive a second portion of the primary light and to optically modify the second portion of the primary light to emit an optically modified primary light having a third peak wavelength that is different from the first and second peak wavelengths.

17 Claims, 6 Drawing Sheets

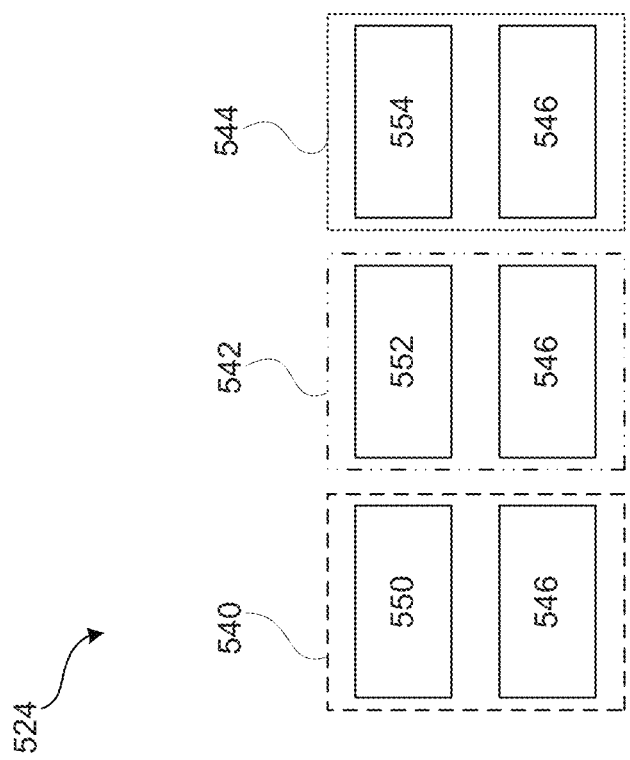
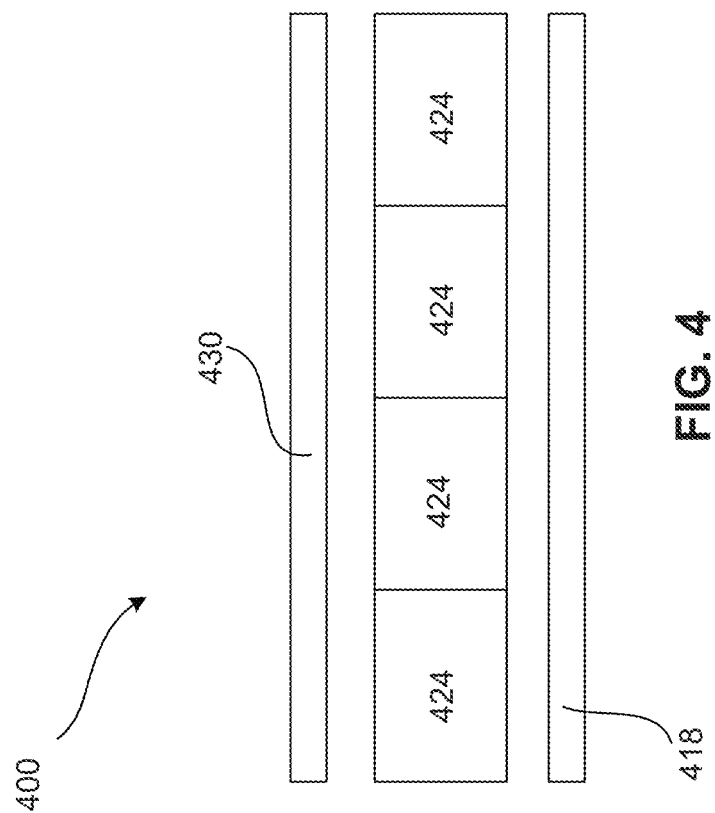

NANOSTRUCTURE BASED DISPLAY DEVICES

CROSS REFERENCE TO RELATED APPLICATIONS

This application is a continuation of U.S. patent application Ser. No. 16/540,541, filed Aug. 14, 2019, which claims the benefit of U.S. Provisional Application No. 62/764,773, filed Aug. 16, 2018, each of which is incorporated by reference in its entirety.

BACKGROUND OF THE INVENTION

Field

The present invention relates to display devices including phosphor films having luminescent nanostructures such as quantum dots (QDs).

Background

Luminescent nanostructures (NSs) such as quantum dots (QDs) represent a class of phosphors that have the ability to emit light at a single spectral peak with narrow line width, creating highly saturated colors. It is possible to tune the emission wavelength based on the size of the NSs. The NSs are used to produce a NS film that may be used as a color down conversion layer in display devices (e.g., liquid crystal display (LCD) device, organic light emitting diode (OLED) display device, micro-LED display device, or quantum dot LED display device). The use of a color down conversion layer in emissive displays can improve the system efficiency by down-converting white light, blue light, or ultra-violet (UV) light to a more reddish light, greenish light, or both before the light passes through a color filter. This use of a color down conversion layer may reduce loss of light energy due to filtering or even eliminate the need for additional filtering entirely.

One of the factors used to define the image quality of a display device is the color gamut coverage of standard RGB color spaces such as Rec. 2020, Rec. 709, DCI P3, NTSC, or sRGB provided by the display device. FIG. 1 illustrates a definition of color gamut coverage of a display device. In FIG. 1, area 101 formed between 1976 CIE color coordinates 101a-101c represents the color gamut of a standard RGB color space (e.g., Rec. 2020) on the 1976 CIE u'-v' chromaticity diagram 100. Area 102 formed between 1976 CIE color coordinates 102a-102c represents the color gamut of the display device on the 1976 CIE u'-v' chromaticity diagram 100. Color gamut coverage of the display device may be defined as a ratio of the overlapping area 103 between areas 101 and 102 to area 101. The wider the color gamut coverage of a display device, the wider is the range of colors identifiable by the human eye (i.e., the visible spectrum) rendered by the display device. Hence, a wider color gamut improves the image quality of the display device assuming the other factors contributing to the image quality are optimized.

The color gamut of a display device may be defined by the color coordinates of the individual sub-pixels. In a display device utilizing color down conversion layers, there is typically a single color light source. The blue sub-pixel consists of this source light while the green and red sub-pixels have color down conversion layers that convert this source (or excitation) light into green and red light, respectively.

In order to optimize the color gamut coverage of a display device using color down conversion layers, the amount of excitation light transmitting through the color conversion layer may need to be minimized, if not eliminated entirely. This can be difficult in a thin (about 3-10 micron) layer using a NS film due to its limited optical density in such a layer. Because a given NS film made from QDs has a higher optical density at shorter wavelengths, one method for increasing the absorption of the excitation light would be to use a shorter wavelength source. However, shorter wavelength light shifts the color coordinate of the blue sub-pixel such that the color gamut coverage is reduced. Thus, there is minimal net benefit in color gamut coverage by simply shifting the wavelength of the source light.

SUMMARY

Accordingly, there is need for display devices with improved color gamut coverage through both higher absorption in the color conversion layers and a longer wavelength source light.

According to an embodiment, a display device includes a backlight unit having a light source and a liquid crystal display (LCD) module. The light source is configured to emit a primary light having a first peak wavelength. The LCD module includes a first sub-pixel having a phosphor film and a second sub-pixel having a non-phosphor film. The phosphor film is configured to receive a first portion of the primary light and to convert the first portion of the primary light to emit a secondary light having a second peak wavelength that is different from the first peak wavelength. The non-phosphor film is configured to receive a second portion of the primary light and to optically modify the second portion of the primary light to emit an optically modified primary light having a third peak wavelength that is different from the first and second peak wavelengths.

According to an embodiment, the non-phosphor film is configured to filter out one or more wavelengths from the second portion of the primary light.

According to an embodiment, the non-phosphor film is configured to absorb one or more wavelengths from the second portion of the primary light.

According to an embodiment, the non-phosphor film is configured to block one or more wavelengths from the second portion of the primary light.

According to an embodiment, the non-phosphor film is configured to reflect one or more wavelengths from the second portion of the primary light.

According to an embodiment, the non-phosphor film is configured to attenuate intensity of the second portion of the primary light.

According to an embodiment, the non-phosphor film comprises a dye, ink, paint, or polymeric material.

According to an embodiment, the non-phosphor film comprises a scattering material.

According to an embodiment, the non-phosphor film comprises scattering particles having titanium oxide, zinc oxide, zinc sulfide, silicone, or a combination thereof.

According to an embodiment, the non-phosphor film does not contain luminescent nanostructures.

According to an embodiment, the first peak wavelength is shorter than the second peak wavelength.

According to an embodiment, the first peak wavelength is shorter than the third peak wavelength.

According to an embodiment, the third peak wavelength is shorter than the second peak wavelength.

According to an embodiment, the first peak wavelength is at about 450 nm or between about 450 nm and about 440 nm.

According to an embodiment, the third peak wavelength is at about 460 nm or between about 460 nm and about 450 nm.

According to an embodiment, the first sub-pixel is configured to emit red light.

According to an embodiment, the first sub-pixel is configured to emit green light.

According to an embodiment, the second sub-pixel is configured to emit blue light.

According to an embodiment, the phosphor film comprises luminescent nanostructures.

According to an embodiment, a relative optical density of the phosphor film is between about 85% and about 140% at the first peak wavelength compared with an optical density at 450 nm.

According to an embodiment, the phosphor film comprises an array of segmented phosphor films.

According to an embodiment, the phosphor film comprises a population of luminescent nanostructures configured to emit red light.

According to an embodiment, the phosphor film comprises a population of luminescent nanostructures configured to emit green light.

According to an embodiment, the LCD module further comprises a first polarizing filter configured to polarize the primary light, a liquid crystal solution layer configured to adjust an angle of polarization of the polarized primary light, and a second polarizing filter, disposed between the phosphor film and the liquid crystal solution layer, configured to control transmission of the polarized primary light from the liquid crystal solution layer to the phosphor film.

According to an embodiment, the display device further comprises an optical cavity. The light source is positioned within the optical cavity.

According to an embodiment, the display device further comprises a light guide plate. The light source is externally coupled to the light guide plate.

According to an embodiment, a display device includes first and second sub-pixels. The first sub-pixel includes a first light source and a phosphor film. The second sub-pixel includes a second light source and a non-phosphor film. The first light source includes an organic light emitting diode (OLED), a micro-LED, or a quantum dot LED (QLED) and is configured to emit a primary light having a first peak wavelength. The phosphor film is optically coupled to the first light source and is configured to convert the primary light from the first light source to a secondary light having a second peak wavelength that is different from the first peak wavelength. The second light source includes an OLED, a micro-LED, or a QLED and is configured to emit a primary light having a first peak wavelength. The non-phosphor film is optically coupled to the second light source and is configured to optically modify the primary light from the second light source to emit an optically modified primary light having a third peak wavelength that is different from the first and second peak wavelengths.

According to an embodiment, the non-phosphor film is positioned on the second light source.

According to an embodiment, the phosphor film is positioned on the first light source.

According to an embodiment, the non-phosphor film is configured to filter out one or more wavelengths from the primary light of the second light source.

According to an embodiment, the non-phosphor film is configured to absorb one or more wavelengths from the primary light of the second light source.

According to an embodiment, the non-phosphor film is configured to block one or more wavelengths from the primary light of the second light source.

According to an embodiment, the non-phosphor film is configured to reflect one or more wavelengths from the primary light of the second light source.

According to an embodiment, the non-phosphor film is configured to attenuate intensity of the primary light of the second light source.

According to an embodiment, the non-phosphor film comprises a dye, ink, paint, or polymeric material.

According to an embodiment, the first peak wavelength is shorter than the second peak wavelength.

According to an embodiment, the first peak wavelength is shorter than the third peak wavelength.

According to an embodiment, the third peak wavelength is shorter than the second peak wavelength.

According to an embodiment, the first peak wavelength is at about 450 nm or between about 450 nm and about 440 nm.

According to an embodiment, the third peak wavelength is at about 460 nm or between about 460 nm and about 450 nm.

According to an embodiment, the first sub-pixel is configured to emit red light.

According to an embodiment, the first sub-pixel is configured to emit green light.

According to an embodiment, the second sub-pixel is configured to emit blue light.

According to an embodiment, the phosphor film comprises luminescent nanostructures.

According to an embodiment, a relative optical density of the phosphor film is between about 85% and about 140% at the first peak wavelength compared with the optical density at 450 nm.

According to an embodiment, the phosphor film comprises an array of segmented phosphor films.

According to an embodiment, the phosphor film comprises a population of luminescent nanostructures configured to emit red light.

According to an embodiment, the phosphor film comprises a population of luminescent nanostructures configured to emit green light.

According to an embodiment, a display device includes a light source, a phosphor film, and a non-phosphor film. The light source is configured to emit a primary light having a first peak wavelength. The phosphor film is configured to receive a first portion of the primary light and to convert the first portion of the primary light to emit a secondary light having a second peak wavelength that is different from the first peak wavelength. The non-phosphor film is configured to receive a second portion of the primary light and to optically modify the second portion of the primary light to emit an optically modified primary light having a third peak wavelength that is different from the first and second peak wavelengths.

According to an embodiment, the phosphor film is a part of a red sub-pixel of the display device.

According to an embodiment, the phosphor film is a part of a green sub-pixel of the display device.

According to an embodiment, the non-phosphor film is a part of a blue sub-pixel of the display device.

According to an embodiment, the light source comprises an organic light emitting diode (OLED), a micro-LED, or a quantum dot LED (QLED).

According to an embodiment, the light source is a part of a backlit unit of the display device.

According to an embodiment, the non-phosphor film is configured to filter out one or more wavelengths from the second portion of the primary light.

According to an embodiment, the non-phosphor film is configured to attenuate intensity of the second portion of the primary light.

According to an embodiment, the non-phosphor film comprises a dye, ink, paint, or polymeric material.

According to an embodiment, the first peak wavelength is shorter than the second peak wavelength.

According to an embodiment, the first peak wavelength is shorter than the third peak wavelength.

According to an embodiment, the third peak wavelength is shorter than the second peak wavelength.

According to an embodiment, the first peak wavelength is at about 450 nm or between about 450 nm and about 440 nm.

According to an embodiment, the third peak wavelength is at about 460 nm or between about 460 nm and about 450 nm.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

FIG. 4 is an exploded cross-sectional view of a light emitting diode (LED) display device, according to an embodiment.

FIG. 5 is an exploded cross-sectional view of a pixel of an LED display device, according to an embodiment.

Figure 1:
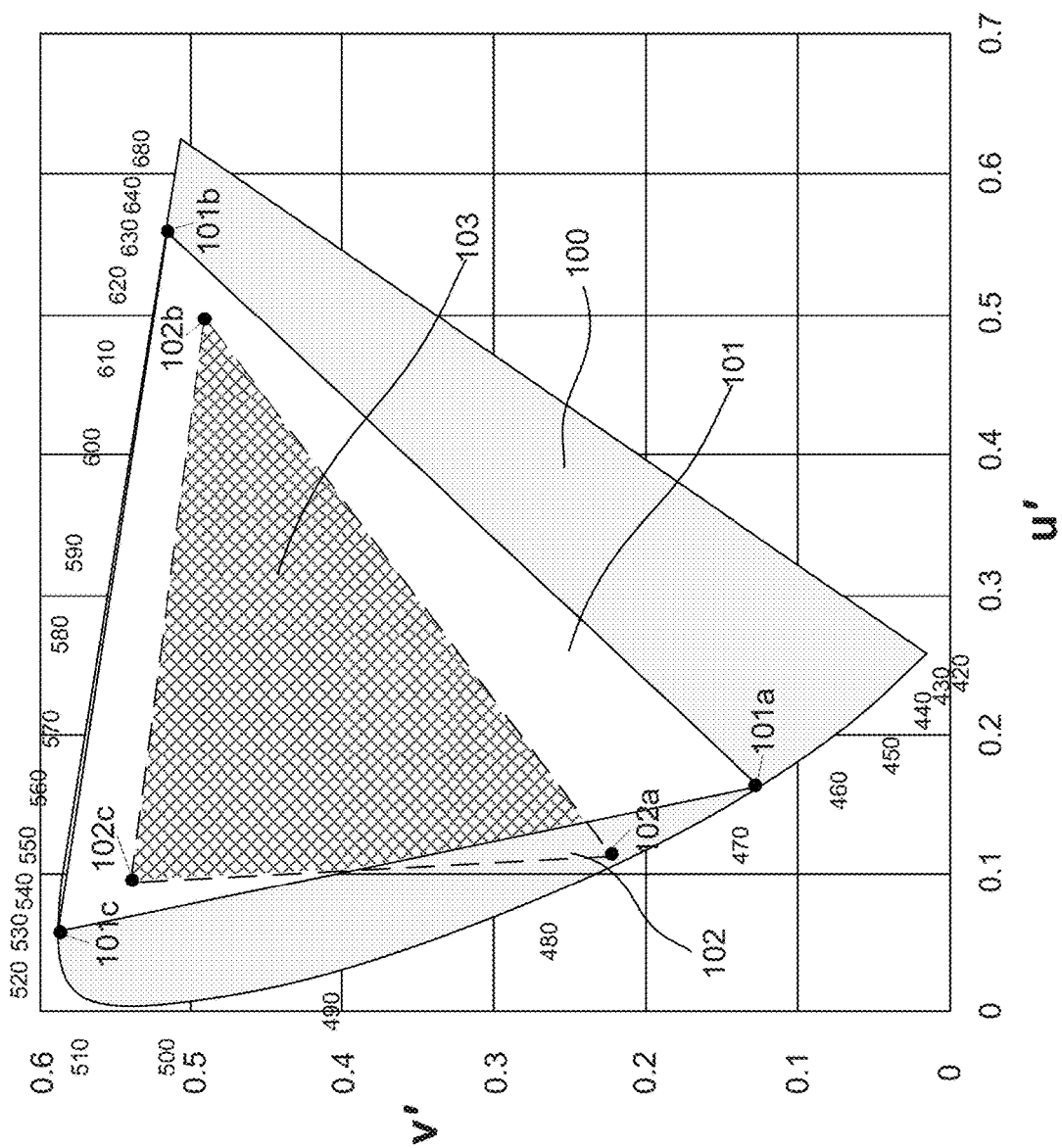
FIG. 1 is a CIE 1976 u'v' chromaticity diagram of Rec. 2020 color gamut and a color gamut of a display device.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements unless mentioned otherwise. The drawing in which an element first appears is indicated by the leftmost digit(s) in the corresponding reference number. Unless otherwise indicated, the drawings provided throughout the disclosure should not be interpreted as to-scale drawings.

DETAILED DESCRIPTION OF THE INVENTION

Although specific configurations and arrangements may be discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications beyond those specifically mentioned herein. It should be appreciated that the particular implementations shown and described herein are examples and are not intended to otherwise limit the scope of the application in any way.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

All numbers in this description indicating amounts, ratios of materials, physical properties of materials, and/or use are to be understood as modified by the word "about," except as otherwise explicitly indicated.

In embodiments, the term "display device" refers to an arrangement of elements that allow for the visible representation of data on a display screen. Suitable display screens may include various flat, curved or otherwise-shaped screens, films, sheets or other structures for displaying information visually to a user. Display devices described herein may be included in, for example, display systems encompassing a liquid crystal display (LCD), televisions, computers, mobile phones, smart phones, personal digital assistants (PDAs), gaming devices, electronic reading devices, digital cameras, tablets, wearable devices, car navigation systems, and the like.

The term "about" as used herein indicates the value of a given quantity varies by ±10% of the value. For example, "about 100 nm" encompasses a range of sizes from 90 nm to 110 nm, inclusive.

The term "substantially" as used herein indicates the value of a given quantity varies by ±1% to ±5% of the value.

In embodiments, the term "forming a reaction mixture" or "forming a mixture" refers to combining at least two components in a container under conditions suitable for the components to react with one another and form a third component.

In embodiment, the terms "light guide plate," "light guide," and "light guide panel" are used interchangeably and refer to an optical component that is suitable for directing electromagnetic radiation (light) from one position to another.

In embodiments, the term "optically coupled" means that components are positioned such that light is able to pass from one component to another component without substantial interference.

The term "nanostructure" as used herein refers to a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, QDs, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "QD" or "nanocrystal" as used herein refers to nanostructures that are substantially monocrystalline. A nanocrystal has at least one region or characteristic dimension with a dimension of less than about 500 nm, and down to the order of less than about 1 nm. The terms "nanocrystal," "QD," "nanodot," and "dot," are readily understood by the ordinarily skilled artisan to represent like structures and are used herein interchangeably. The present invention also encompasses the use of polycrystalline or amorphous nanocrystals.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the term "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

The term "ligand" as used herein refers to a molecule capable of interacting (whether weakly or strongly) with one or more faces of a nanostructure, e.g., through covalent, ionic, van der Waals, or other molecular interactions with the surface of the nanostructure.

The term "quantum yield" (QY) as used herein refers to the ratio of photons emitted to photons absorbed, e.g., by a nanostructure or population of nanostructures. As known in the art, quantum yield is typically determined by a comparative method using well-characterized standard samples with known quantum yield values.

The term "primary emission peak wavelength" as used herein refers to the wavelength at which the emission spectrum exhibits the highest intensity.

The term "full width at half-maximum" (FWHM) as used herein refers to refers to a measure of spectral width. In the case of an emission spectrum, a FWHM can refer to a width of the emission spectrum at half of a peak intensity value.

The term Forster radius used herein is also referred as Forster distance in the art.

The terms "brightness" are used herein interchangeably and refer to a photometric measure of a luminous intensity per unit area of a light source or an illuminated surface.

The terms "specular reflectors," "specularly reflective surfaces," and "reflective surfaces" are used herein to refer to elements, materials, and/or surfaces capable of specular reflection.

The term "specular reflection" is used herein to refer to a mirror-like reflection of light (or of other kinds of wave) from a surface, when an incident light hits the surface.

The term "nanostructure (NS) film" is used herein to refer to a film having luminescent nanostructures.

The term "red sub-pixel" is used herein to refer to an area of a pixel that emits light having a primary emission peak wavelength in the red wavelength region of the visible spectrum. In some embodiments, the red wavelength region may include wavelengths ranging from about 620 nm to about 750 nm.

The term "green sub-pixel" is used herein to refer to an area of a pixel that emits light having a primary emission peak wavelength in the green wavelength region of the visible spectrum. In some embodiments, the green wavelength region may include wavelengths ranging from about 495 nm to about 570 nm.

The term "blue sub-pixel" is used herein to refer to an area of a pixel that emits light having a primary emission peak wavelength in the blue wavelength region of the visible spectrum. In some embodiments, the blue wavelength region may include wavelengths ranging from about 435 nm to about 495 nm.

The published patents, patent applications, websites, company names, and scientific literature referred to herein are hereby incorporated by reference in their entirety to the same extent as if each was specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

Technical and scientific terms used herein have the meaning commonly understood by one of skill in the art to which the present application pertains, unless otherwise defined. Reference is made herein to various methodologies and materials known to those of skill in the art.

This disclosure provides various embodiments of nanostructure-based display devices that help to improve or eliminate existing trade-offs between achieving the desired quantum efficiency and the desired color gamut in display devices. These various embodiments also help to improve color balance of display devices.

Example Embodiments of a Liquid Crystal Display (LCD) Device

Figure 2:
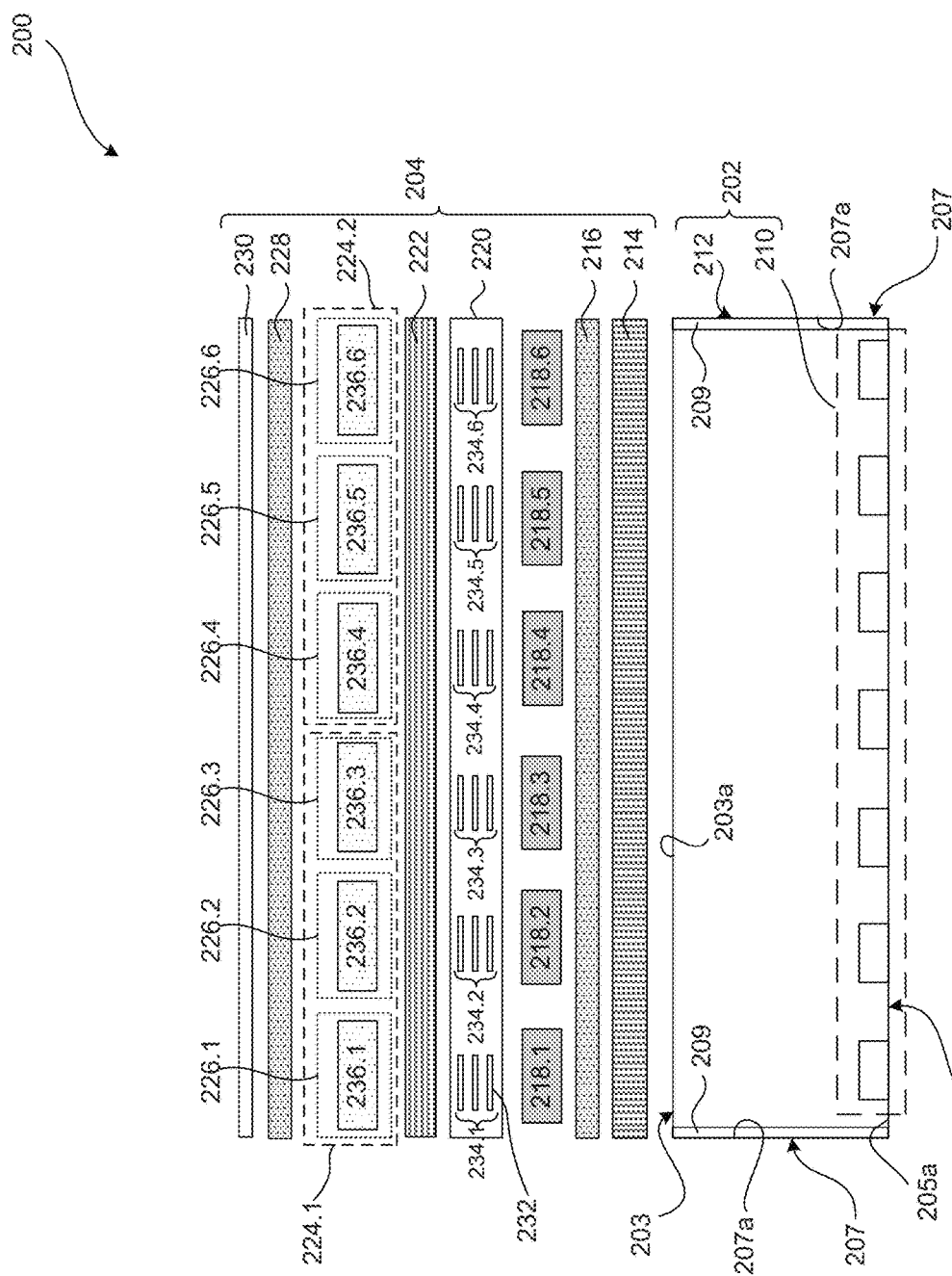
FIGS. 2-3 are exploded cross-sectional views of liquid crystal display (LCD) devices, according to an embodiment.

FIG. 2 illustrates a schematic of an exploded cross-sectional view of an LCD display device 200, according to an embodiment. A person of ordinary skill in the art will recognize that the view of display device in FIG. 2 is shown for illustration purposes and may not be drawn to scale. LCD display device 200 may include a backlight unit (BLU) 202 and an LCD module 204, according to an embodiment.

BLU 202 may include an optical cavity 212 and an array of LEDs 210 (e.g., blue LEDs, UV LEDs, or a combination thereof) coupled to optical cavity 212. Optical cavity 212 may include a top side 203, a bottom side 205, sidewalls 207, and a closed volume confined by top side 203, bottom side 205, and sidewalls 207. LEDs 210 may be coupled to a top surface 205a of bottom side 205 within the closed volume. LEDs 210 may be configured to provide a primary light (e.g., a blue light, a UV light, or a combination thereof) that may be processed through LCD module 204 and subsequently, transmitted to and distributed across a display screen 230 of LCD display device 200. In some embodiments, LEDs 210 may comprise blue LEDs that emit light having a primary emission peak wavelength between about 440 nm and about 460 nm. In some embodiments, LEDs 210 may comprise blue LEDs that emit light having one or more bands of wavelengths between about 430 nm and about 470 nm with a primary emission peak wavelength between about 440 nm and 460 nm. In an embodiment, the array of LEDs 210 may comprise a two-dimensional array of LEDs that are spread across an area of top surface 205a and the area may be equal to the surface area of display screen 230.

It should be noted that even though two sidewalls 207 are shown in FIG. 2, a person skilled in the art would understand that optical cavity 212 may include any number of sidewalls 207, according to various embodiments. For example, optical cavity 212 may have a cuboid shape and may include four sidewalls similar to sidewalls 207. Optical cavity 212 is not restricted to being cuboid in shape or having other straight-sided shapes. Optical cavity 212 may be configured to be any type of geometric shape, such as but not limited to cylindrical, trapezoidal, spherical, or elliptical, according to various embodiments, without departing from the spirit and scope of the present invention. It should also be noted that the rectangular cross-sectional shape of optical cavity 212, as illustrated in FIG. 2, is for illustrative purposes, and is not limiting. Optical cavity 212 may have other cross-sectional shapes (e.g., trapezoid, oblong, rhomboid), according to various embodiments, without departing from the spirit and scope of the present invention.

Top side 203 of optical cavity 212 may be configured to be an optically diffusive and transmissive layer such that light from LEDs 210 may exit optical cavity 212 through top side 203 with a substantially uniform distribution of brightness across top surface 203a of top side 203. In an embodiment, top side 203 may include optically transparent areas and optically translucent areas that are strategically arranged over LEDs 210 to provide the substantially uniform distribution in light brightness exiting top side 203. In another embodiment, top side 203 may include pores of varying sizes in diameters and optically translucent areas that are strategically arranged to provide the substantially uniform distribution in light brightness exiting top side 203.

Bottom side 205 and/or sidewalls 207 may be constructed from one or more materials (e.g., metals, non-metals, and/or alloys) that are configured to have specularly reflective top surface 205a and/or specularly reflective side wall interior surfaces 207a, respectively. For example, top surface 205a and/or side wall interior surfaces 207a may be mirror-like surfaces having mirror-like reflection properties. In some embodiments, top surface 205a and/or side wall interior surfaces 207a may be completely specularly reflective or partially specularly reflective and partially scattering. In some other embodiments, top surface 205a and/or side wall interior surfaces 207a include diffuse reflectors.

In alternate embodiments, optical cavity 212 may include specular reflectors 209 coupled to sidewall interior surfaces 207a. Specular reflectors 209 may be coupled to sidewall interior surfaces 207a using optically transparent adhesive. The optically transparent adhesive may comprise tape, various glues, polymeric compositions such as silicones, etc. Additional optically transparent adhesive may include various polymers, including, but not limited to, poly(vinyl butyral), poly(vinyl acetate), epoxies, and urethanes; silicone and derivatives of silicone, including, but not limited to, polyphenylmethylsiloxane, polyphenylalkylsiloxane, polydiphenylsiloxane, polydialkylsiloxane, fluorinated silicones and vinyl and hydride substituted silicones; acrylic polymers and copolymers formed from monomers including, but not limited to, methylmethacrylate, butylmethacrylate, and laurylmethacrylate; styrene based polymers; and polymers that are cross linked with difunctional monomers, such as divinylbenzene, according to various examples.

Specularly reflective top surface 205a and side wall interior surfaces 207a and specular reflectors 209 may substantially minimize absorption of light from LEDs 210 through bottom side 205 and/or side walls 207 and thus, substantially minimize loss of luminance within optical cavity 212 and increase light output efficiency of BLU 202.

In alternate embodiments, BLU 202 may further include one or more brightness enhancement films (BEFs) (not shown) disposed between optical cavity 212 and LCD module 204. The one or more BEFs may have reflective and/or refractive films, reflective polarizer films, light extraction features, light recycling features, prism films, groove films, grooved prism films, prisms, pitches, grooves, or other suitable brightness enhancement features. The brightness-enhancing features of BEFs may be configured to reflect a portion of the primary light (e.g., blue light from optical cavity 212) back toward optical cavity 212, thereby providing recycling of the primary light.

LCD module 204 may be configured to process the light received from BLU 202 to desired characteristics for transmission to and distribution across display screen 230. In some embodiments, LCD module 204 may include one or more polarizing filters, such as first and second polarizing filters 214 and 222, one or more optically transparent substrates such as first and second optically transparent substrates 216 and 228, switching devices 218.1 through 218.6 arranged in a 2-D array on first substrate 216, a liquid crystal (LC) solution layer 220, a plurality of pixels such as pixels 224.1 and 224.2 arranged in a 2-D array, and display screen 230.

In some embodiments, pixel 224.1 may include sub-pixels 226.1 through 226.3 and pixel 224.2 may include sub-pixels 226.4 through 226.6. In some embodiments, each of pixels 224.1 and 224.2 may be tri-chromatic, for example, having red sub-pixels 226.1 and 226.4, green sub-pixels 226.2 and 226.5, and blue sub-pixels 226.3 and 226.6, respectively. The arrangement order of red, green, and blue sub-pixels 226.1 through 226.6 in respective pixels 224.1 and 224.2 is illustrative and is not limiting. The red, green, and blue sub-pixels in each of pixels 224.1 and 224.2 may be arranged in any order with respect to each other. In some embodiments, pixels 224.1 and/or 224.2 may be monochromatic having either red, green, or blue sub-pixels 226.1 through 226.6. The number of pixels and switching devices shown in FIG. 2 are illustrative and are not limiting. LCD module 204 may have any number of switching devices and pixels without departing from the spirit and scope of this disclosure.

The term "red sub-pixel" is used herein to refer to an area of a pixel that emits light having a primary emission peak wavelength in the red wavelength region of the visible spectrum. In some embodiments, the red wavelength region may include wavelengths ranging from about 620 nm to about 750 nm. The term "green sub-pixel" is used herein to refer to an area of a pixel that emits light having a primary emission peak wavelength in the green wavelength region of the visible spectrum. In some embodiments, the green wavelength region may include wavelengths ranging from about 495 nm to about 570 nm. The term "blue sub-pixel" is used herein to refer to an area of a pixel that emits light having a primary emission peak wavelength in the blue wavelength region of the visible spectrum. In some embodiments, the blue wavelength region may include wavelengths ranging from about 435 nm to about 495 nm.

Light from BLU 202 may be polarized through first polarizing filter 214 and the polarized light may be transmitted to LC solution layer 220. LC solution layer 220 may include LCs 232 having rod-shaped molecules that may act as shutters to control the amount of light transmission from LC solution layer 220. In some embodiments, LCs 232 may be arranged in a 3-D array. Columns 234.1 through 234.6 of the 3-D array of LCs may be independently controlled by respective switching devices 218.1 through 218.6. In some embodiments, switching devices 218.1 through 218.6 may comprise transistors, such as, for example, thin film transistors (TFTs). By controlling LCs 232, the amount of light travelling from columns 234.1 through 234.6 to respective sub-pixels 226.1 through 226.6 may be controlled, and consequently, the amount of light transmitting from sub-pixels 226.1 through 226.6 is controlled.

LCs 232 may be twisted to varying degrees depending on the voltage applied to columns 234.1 through 234.6 by respective switching devices 218.1 through 218.6. By controlling the twisting of LCs 232, the polarization angle of light passing through LC solution layer 220 may be controlled. Light leaving LC solution layer 220 may then pass through second polarizing filter 222 that may be positioned at 90 degrees with respect to first polarizing filter 214. The angle of polarization of the light leaving LC solution layer 220 and entering second polarizing filter 222 may determine how much of the light is able to pass through and exit from second polarizing filter 222. Second polarizing filter 222 may attenuate the light, block the light, or allow the light to pass without attenuation based on its angle of polarization.

Portions of light travelling through columns 234.1 through 234.6 of LCs and exiting out of second polarizing filter 222 may then enter respective individual sub-pixels 226.1 through 226.6. These portions of light may undergo a stage of color filtering and/or conversion through the respective individual sub-pixels 226.1 through 226.6 to achieve the desired optical characteristics for light distribution across display screen 230.

In some embodiments, sub-pixels 226.1 through 226.6 may include respective color processing elements 236.1 through 236.6 (e.g., phosphor film or color filter) that may optically process the portions of light entering respective sub-pixels 226.1 through 226.6. The following discussion of pixel 224.1 and its sub-pixels 226.1 through 226.3 applies to pixel 224.2 and its sub-pixels 226.4 through 226.6, respectively, unless mentioned otherwise. In some embodiments, color processing elements 236.1 and 236.2 may each include phosphor films. Phosphor films (e.g., NS film 700 described with reference to FIG. 7) may include luminescent nanostructures such as QDs (e.g., NS 600 described with reference to FIG. 6), according to some embodiments. The phosphor films may be down-converters, where the portions of light (also referred as primary light) entering the respective individual sub-pixels 226.1 through 226.3 may be absorbed, for example, by the luminescent nanostructures in the phosphor films and re-emitted as secondary light having a lower energy or longer wavelength than the primary light.

In some embodiments, the red sub-pixel 226.1 may include color processing element 236.1 having a phosphor film that has luminescent nanostructures that absorb the primary light and emit a first secondary light having a primary emission peak wavelength in the red wavelength region of the visible spectrum light. In some embodiments, green sub-pixel 226.2 may include color processing element 236.2 having a phosphor film that has luminescent nanostructures that absorb the primary light and emit a second secondary light having a primary emission peak wavelength in the green wavelength region of the visible spectrum light. Each of color processing elements 236.1 and 236.2 may be segmented elements that are placed adjacent to each other on second polarizing filter 222 or on an optically transparent substrate (not shown). Each of the segmented elements may be placed in a manner such that there is negligible gap at interfaces between adjacent segmented elements to prevent leakage of primary light through the interfaces. In alternate embodiments, each of color processing elements 236.1 and 236.2 may be different regions of a continuous color processing element.

In some embodiments, color processing element 236.3 of blue sub-pixel 226.3 may have one or more non-phosphor films that do not contain luminescent nanostructures such as QDs (e.g., NS 600 described with reference to FIG. 6) as there may be no need for down-conversion of primary light from blue LEDs 210 for blue sub-pixels 226.3. Portions of the primary light may be used to form the blue light that is emitted from blue sub-pixel 226.3. However, the primary blue light entering blue sub-pixel 226.3 may be optically modified before being emitted out of blue pixel 226.3. The optical modification may be performed by the one or more non-phosphor films of color processing element 236.3 that may have color filtering properties to filter out one or more selective wavelengths or range of wavelengths of the portions of the primary light entering sub-pixel 226.3. This filtering helps to modify the intensity and/or the primary emission peak wavelength of the primary light entering blue sub-pixel 226.3 and produce an optically modified primary light that is emitted from blue sub-pixel 226.3. For example, this filtering may help to attenuate the intensity and/or shift the primary emission peak wavelength of the primary light entering blue sub-pixel 226.3 to a longer wavelength.

The primary blue light entering blue sub-pixel 226.3 is optically modified such that the combined light emitted from pixel 224.1 produces the desired (e.g., optimal) white point value and/or color gamut coverage for LCD display device 200 without sacrificing the desired (e.g., optimal) optical absorption efficiency (i.e. optical density for a given film thickness) of phosphor films of color processing elements 226.1 and 226.2. In some embodiments, the desired white point value and/or the color gamut coverage may be as required by high dynamic range (HDR) imaging standards. In some embodiments, the desired white point value may be nominally D65, or CIE x=0.313 and CIE y=0.329, where x and y are the Cartesian coordinates of the CIE 1931 color space. The desired absorption efficiency of the phosphor films may be at a first primary emission peak wavelength that is shorter than a second primary emission peak wavelength at which light from blue sub-pixel 226.3 is emitted to achieve the desired white point value and/or color gamut coverage. By using the filtering properties of color processing element 236.3 as described above, the same light source (e.g., LEDs 210) may be used to provide these first and second primary emission peak wavelengths. The same light source may emit light having one or more wavelengths or bands of wavelengths between about 430 nm and about 470 nm with a primary emission peak wavelength between about 440 nm and 460 nm. The first primary emission peak wavelength may be the primary emission peak wavelength of the primary light of the light source (e.g., LEDs 210). The second primary emission peak wavelength may be obtained after the shifting of the primary emission peak wavelength of the primary light to a longer wavelength using color processing element 236.3 as described above.

In some embodiments, the first primary emission peak wavelength may be at about 450 nm, below 450 nm (e.g., at about 448 nm, at about 446 nm, at about 444 nm, at about 442 nm, or at about 440 nm), between about 450 nm and about 448 nm, between about 448 nm and about 446 nm, between about 446 nm and about 444 nm, between about 444 nm and about 442 nm, between about 442 nm and about 440 nm, or between about 450 nm and about 440 nm.

In some embodiments, the second primary emission peak wavelength may be above 450 nm (e.g., at about 452 nm, at about 454 nm, at about 456 nm, at about 458 nm, or at about 460 nm), between about 452 nm and about 454 nm, between about 454 nm and about 456 nm, between about 456 nm and about 458 nm, between about 458 nm and about 460 nm, between about 460 nm and about 462 nm or between about 452 nm and about 462 nm.

The desired optical absorption efficiency may be achieved when the portions of the primary light (e.g., blue light) entering the phosphor films are absorbed by them without allowing the primary light to be leaked out of red and green sub-pixels 226.1 and 226.2. In some embodiments, the desired optical absorption efficiency is achieved when the relative optical density of the phosphor films at a primary emission peak wavelength of the primary light compared with the optical density at 450 nm is greater than about 85% (e.g., about 90%, about 95%, about 100%, about 105%, about 110%, about 120%, about 130%, or about 140%), between about 85% and about 90%, between about 90% and about 95%, between about 95% and about 100%, between about 100% and about 105%, between about 105% and about 110%, between about 110% and about 115%, between about 115% and about 120%, between about 120% and about 125%, between about 125% and about 130%, between about 130% and about 135%, between about 135% and about 140%, or between about 85% and about 140%.

In some embodiments, the one or more non-phosphor films of color processing element 236.3 may exhibit optical absorption, transmissive, reflective, and/or scattering properties, but do not exhibit optical emission properties. The one or more non-phosphor films may be selected based on their optical absorption, transmissive, reflective, and/or scattering to filter out the one or more selective wavelengths or range of wavelengths during the above described optical modification. In some embodiments, the one or more non-phosphor films may include the same optical properties. In some embodiment, each of the one or more non-phosphor films may include an optical property different from each other.

The one or more non-phosphor films may be selected such that they may be inexpensively disposed on second polarizing filter 222 or on an optically transparent substrate (not shown). For example, the one or more non-phosphor films may include dye (e.g., narrow band organic Exciton P491 dye or Exciton ABS430 dye), ink, paint, polymeric material, and/or any material that may be sprayed, painted, spin-coated, printed, or any other suitable low temperature (e.g., below 100° C.) deposition method. Printing may be done using, for example, a plotter, an inkjet printer, or a screen printer. In some embodiments, the one or more non-phosphor films may be directly disposed on second polarizing filter 222 or on an optically transparent substrate (not shown).

In some embodiments, the one or more non-phosphor films may include scattering particles (e.g., particles having diameters ranging from about 100 nm to about 500 μm) of titanium oxide, zinc oxide, zinc sulfide, silicone, or a combination thereof. In some embodiments, color processing element 236.3 may include a substrate having the one or more non-phosphor films disposed on it. In some embodiments, color processing element 236.3 may be dichroic filters that, for example, may reflect the one or more selective wavelengths or range of wavelengths of the primary light (e.g., blue light) during the above described optical modification while transmitting the wavelength corresponding to the second primary emission peak wavelength.

In some embodiments, each of color processing elements 236.1 through 236.3 may be different regions of a continuous color processing element placed on second polarizing filter 222 or on an optically transparent substrate (not shown).

Display screen 230 may be configured to generate images. Display screen 230 may be a touch screen display, according to an embodiment. LCD display device 200 may further include one or more medium materials (not shown) disposed between any of the adjacent elements in LCD display device 200, for example between optical cavity 212 and LCD module 204, on either sides of LC solution layer 220, or between any other elements of LCD display device 200. The one or more medium materials may include, but not limited to, substrates, a vacuum, air, gas, optical materials, adhesives, optical adhesives, glass, polymers, solids, liquids, gels, cured materials, optical coupling materials, index-matching or index-mismatching materials, index-gradient materials, cladding or anti-cladding materials, spacers, epoxy, silica gel, silicones, brightness-enhancing materials, scattering or diffuser materials, reflective or anti-reflective materials, wavelength-selective materials, wavelength-selective anti-reflective materials, or other suitable medium material. Suitable materials may include silicones, silicone gels, silica gel, epoxies (e.g., Loctite™ Epoxy E-30CL), acrylates (e.g., 3M™ Adhesive 2175). The one or more medium materials may be applied as a curable gel or liquid and cured during or after deposition, or pre-formed and pre-cured prior to deposition. Curing methods may include UV curing, thermal curing, chemical curing, or other suitable curing methods known in the art. Index-matching medium materials may be chosen to minimize optical losses between elements of BLU 202 and LCD module 204.

LCD display device 200 may have a geometric shape, such as but not limited to cylindrical, trapezoidal, spherical, or elliptical, according to various embodiments, without departing from the spirit and scope of the present invention. LCD display device 200 is not restricted to being cuboid in shape or having other straight-sided shapes. It should be noted that the rectangular cross-sectional shape of LCD display device 200 is for illustrative purposes, and is not limiting. LCD display device 200 may have other cross-sectional shapes (e.g., trapezoid, oblong, rhomboid), according to various embodiments, without departing from the spirit and scope of the present invention. It should also be noted that even though optical cavity 212, substrates 216 and 228, polarizing filter 214 and 222, and display screen 230 are shown in FIG. 2 to have similar dimensions along X-axis, a person skilled in the art would understand that each of these components may have dimensions different from each other in one or more directions, according to various embodiments.

Figure 3:
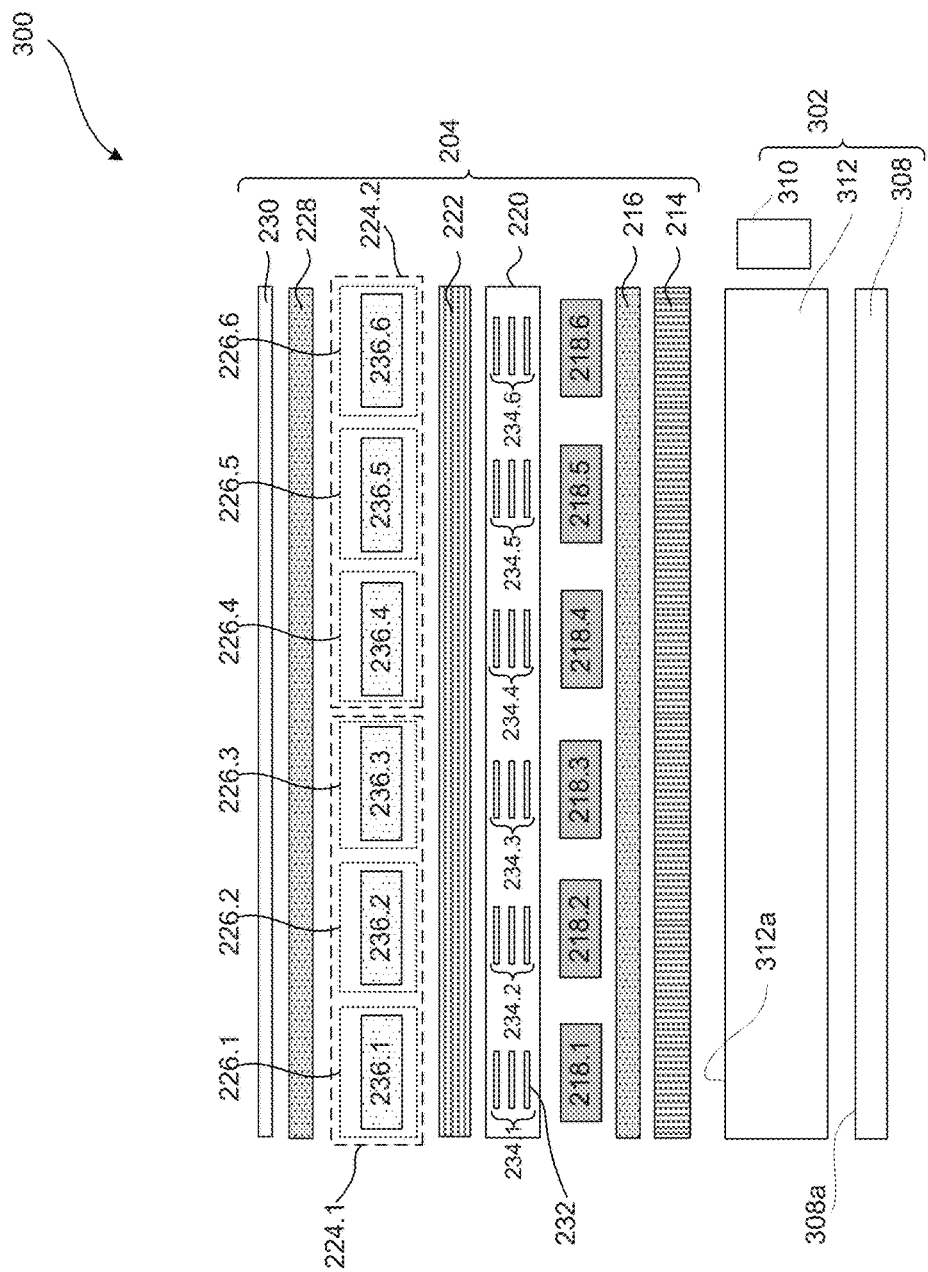

FIG. 3 illustrates a schematic of an exploded cross-sectional view of an edge-lit LCD display device 300, according to an embodiment. LCD display device 300 may include a BLU 302 and LCD module 204. Elements in FIG. 3 with the same annotations as elements in FIG. 2 are described above.

BLU 302 may include an LED 310 (e.g., a blue LED), a light guide plate (LGP) 312, and a reflector 308. BLU 302 may be configured to provide a primary light (e.g., a blue light) that may be processed through LCD module 204 and subsequently, transmitted to and distributed across display screen 230. The blue LED may emit in the range from about 440 nm to about 470 nm. In some embodiments, LED 310 may emit light having a primary emission peak wavelength between about 440 nm and about 460 nm. In some embodiments, LED 310 may emit light having one or more bands of wavelengths between about 430 nm and about 470 nm with a primary emission peak wavelength between about 440 nm and 460 nm. According to an embodiment, the blue LED may be, for example, a GaN LED that emits blue light at a wavelength of about 450 nm.

LGP 312 may include fiber optic cables, polymeric or glass solid bodies such as plates, films, containers, or other structures, according to some embodiments. The size of LGP 312 may depend on the ultimate application and characteristics of LED 310. The thickness of LGP 312 may be compatible with thickness of LED 310. The other dimensions of LGP 312 may be designed to extend beyond the dimensions of LED 310, and may be on the order of 10's of millimeters, to 10's to 100's of centimeters.

In some embodiments, the materials of LGP 312 may include polycarbonate (PC), poly methyl methacrylate (PMMA), methyl methacrylate, styrene, acrylic polymer resin, glass, or other suitable LGP materials. Suitable manufacturing methods for LGP 312 may include injection molding, extrusion, or other suitable embodiments. LGP 312 may be configured to provide uniform primary light emission, such that primary light entering LCD module 204 may be of uniform color and brightness. LGP 312 may include a substantially uniform thickness over the entire LGP 312 surface. Alternatively, LGP 312 may have a wedge-like shape. In some embodiments, LGP 312 may be optically coupled to LED 310 and may be physically connected to or detached from LED 310. For physically connecting LGP 312 to LED 310, optically transparent adhesive may be used (not shown).

In some embodiments, BLU 302 may include an array of LEDs (not shown), each of which may be similar to LED 310 in structure and function. The array of LEDs may be adjacent to LGP 312 and may be configured to provide the primary light to LCD module 204 for processing and for subsequent transmission to display screen 230 as discussed above with reference to FIG. 2.

In some embodiments, reflector 308 may be configured to increase the amount of light that is emitted from LGP 312. Reflector 308 may comprise a suitable material, such as a reflective mirror, a film of reflector particles, a reflective metal film, or other suitable conventional reflectors. In some embodiments, reflector 308 may include a white film. In some embodiments, reflector 308 may include additional functionality or features, such as scattering, diffuser, or brightness-enhancing features.

Example Embodiments of LED Display Devices

FIG. 4 illustrates a schematic of an exploded cross-sectional view of a light emitting diode (LED) display device 400, according to an embodiment. LED display device 400 may include a back plate 418, a plurality of pixels 424 arranged in a 2-D array on back plate 418, and a transmissive cover plate 430, according to an embodiment. The number of pixels shown in FIG. 4 is illustrative and is not limiting. Device 400 may have any number pixels without departing from the spirit and scope of this disclosure. LED display device 400 may be referred as an organic LED (OLED) display device if OLED-based light sources are used in pixels 424, as a micro-LED display device if micro-LED-based light sources are used in pixels 424, as a quantum dot LED (QLED) display device if QLED-based light sources are used in pixels 424.

Cover plate 430 may serve as display screen to generate images and/or may be configured to provide environmental sealing to underlying structures of LED display device 400. Cover plate 430 may be also configured to be an optically transparent substrate on which other components (e.g., electrode) of LED display device 400 may be disposed. In some embodiments, pixels 424 may be tri-chromatic having red, green, and blue sub-pixels. In some embodiments, pixels 424 may be monochromatic having either red, green, or blue sub-pixels. In some embodiments, LED display device 400 may have a combination of both tri-chromatic and monochromatic pixels 424.

LED display device 400 may further include control circuitry (not shown) of pixels 424. Pixels 424 may be independently controlled by switching devices such as, for example, thin film transistors (TFTs). LED display device 400 may have a geometric shape, such as but not limited to cylindrical, trapezoidal, spherical, or elliptical, according to various embodiments, without departing from the spirit and scope of the present invention. It should be noted that even though back plate 418, array of pixels 424, and cover plate 430 are shown in FIG. 4 to have similar dimensions along X-axis, a person skilled in the art would understand that each of these components may have dimensions different from each other in one or more directions, according to various embodiments.

FIG. 5 illustrates an exploded cross-sectional view of a tri-chromatic pixel 524 of an LED display device, according to an embodiment. One or more of pixels 424 of LED display device 400 of FIG. 4 may have a configuration similar to pixel 524. Pixel 524 may include a red sub-pixel 540, a green sub-pixel 542, and a blue sub-pixel 544. The arrangement order of red, green, and blue sub-pixels 540, 542, and 544 is illustrative and is not limiting. The red, green, and blue sub-pixels 540, 542, and 544 may be arranged in any order with respect to each other.

Each of red, green, and blue sub-pixels 540, 542, and 544 may include a light source 546 (e.g., a blue OLED, a blue micro-LED, a blue QLED, a UV OLED, a UV micro-LED, or a UV QLED) and respective color processing elements 550, 552, and 554. The above discussion of color processing elements 236.1, 236.2 and 236.3 applies to color processing elements 550, 552, and 554, respectively, unless mentioned otherwise.

Each of light sources 546 may be configured to provide a primary light (e.g., a blue light, a UV light, or a combination thereof) that may be processed through respective red, green, and blue sub-pixels 540, 542, and 544 and subsequently, transmitted to and distributed across a display screen of an LED display device (e.g., device 400). In some embodiments, each of light sources 546 may emit light having a primary emission peak wavelength between about 440 nm and about 460 nm. In some embodiments, each of light sources 546 may emit light having one or more bands of wavelengths between about 430 nm and about 470 nm with a primary emission peak wavelength between about 440 nm and 460 nm.

In some embodiments, color processing element 550 may include a phosphor film and may be disposed on an emitting surface of light source 546 of red sub-pixel 540. In some embodiments, color processing element 550 may include a substrate having the phosphor film disposed on it and the substrate may be disposed on the emitting surface of light source 546 of red sub-pixel 540. The phosphor film of color processing element 550 may have luminescent nanostructures such as QDs (e.g., NS 600 described with reference to FIG. 6) that absorb primary light from light source 546 of red sub-pixel 540 and emit red light having a primary emission peak wavelength in the red wavelength region of the visible spectrum.

In some embodiments, color processing element 552 may include a phosphor film and may be disposed on an emitting surface of light source 546 of green sub-pixel 542. In some embodiments, color processing element 552 may include a substrate having the phosphor film disposed on it and the substrate may be disposed on the emitting surface of light source 546 of green sub-pixel 542. The phosphor film of color processing element 552 may have luminescent nanostructures such as QDs (e.g., NS 600 described with reference to FIG. 6) that absorb primary light from light source 546 of green sub-pixel 542 and emit green light having a primary emission peak wavelength in the green wavelength region of the visible spectrum.

In some embodiments, color processing element 544 may have one or more non-phosphor films and may be disposed on an emitting surface of light source 546 of blue sub-pixel 544. In some embodiments, color processing element 554 may include a substrate having the one or more non-phosphor films disposed on it and the substrate may be disposed on the emitting surface of light source 546 of blue sub-pixel 544. The one or more non-phosphor films may be selected such that they may be inexpensively disposed on the emitting surface. The one or more non-phosphor films do not contain luminescent nanostructures such as QDs (e.g., NS 600 described with reference to FIG. 6) as there may be no need for down-conversion of primary light from blue light source 546 of blue sub-pixel 544. Similar to color processing element 236.3, the one or more non-phosphor films of color processing element 554 may be configured to optically modify the primary blue light from light source 546 entering blue sub-pixel 544 before being emitted out of blue pixel 544. Thus, the filtering out of one or more selective wavelengths or range of wavelengths of the portions of the primary light entering sub-pixel 544 may modify the intensity and/or the primary emission peak wavelength of the primary light entering blue sub-pixel 544 and produce an optically modified primary light that is emitted from blue sub-pixel 544. For example, this filtering may help to attenuate the intensity and/or shift the primary emission peak wavelength of the primary light entering blue sub-pixel 544 to a longer wavelength.

The primary blue light entering blue sub-pixel 544 is optically modified such that the combined light emitted from pixel 524 produces the desired (e.g., optimal) white point value and/or color gamut coverage for its LED display device (e.g., device 400) without sacrificing the desired (e.g., optimal) optical absorption efficiency of phosphor films of color processing elements 550 and 552. Similar to pixel 224.1 (FIG. 2), the desired absorption efficiency of the phosphor films may be at the first primary emission peak wavelength that is shorter than the second primary emission peak wavelength at which light from blue sub-pixel 544 is emitted to achieve the desired white point value and/or color gamut coverage. By using the filtering properties of color processing element 554 as described above, same light sources 546 may be used to provide these first and second primary emission peak wavelengths. Using same light sources 546 may help in reducing cost and complexity of manufacturing LED display devices (e.g., device 400) having pixels such as pixel 524.

The first primary emission peak wavelengths may be the primary emission peak wavelengths of the primary light of the light sources 546 of red and green sub-pixels 540 and 542. The second primary emission peak wavelength may be obtained in blue sub-pixel 544 after the shifting of the primary emission peak wavelength of its primary light to a longer wavelength using color processing element 544 as described above.

Example Embodiments of a Barrier Layer Coated Nanostructure

Figure 6:
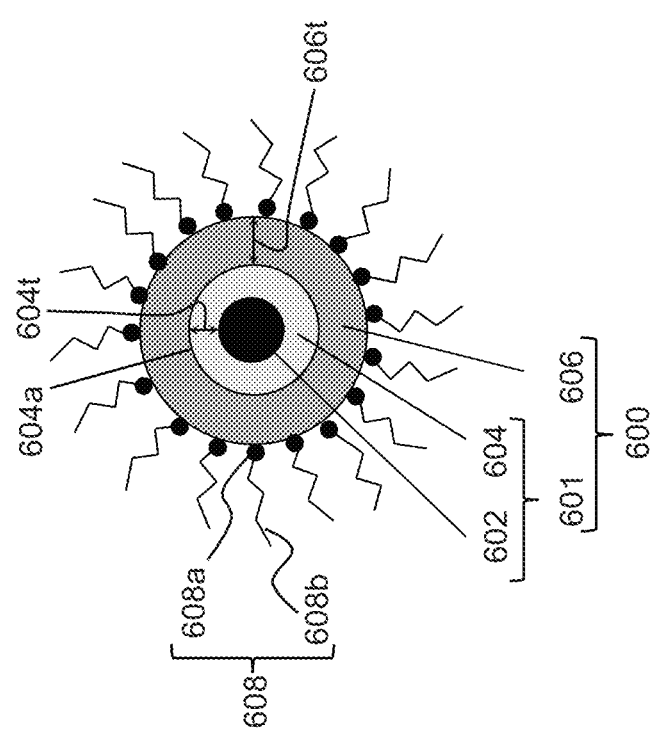
FIG. 6 is a schematic of a cross-sectional view of a nanostructure, according to an embodiment.

FIG. 6 illustrates a cross-sectional structure of a barrier layer coated luminescent nanostructure (NS) 600, according to an embodiment. In some embodiments, a population of NS 600 may be included in phosphor films 236.1, 236.2, 550, and/or 552. Barrier layer coated NS 600 includes a NS 601 and a barrier layer 606. NS 601 includes a core 602 and a shell 604. Core 602 includes a semiconducting material that emits light upon absorption of higher energies. Examples of the semiconducting material for core 602 include indium phosphide (InP), cadmium selenide (CdSe), zinc sulfide (ZnS), lead sulfide (PbS), indium arsenide (InAs), indium gallium phosphide, (InGaP), cadmium zinc selenide (CdZnSe), zinc selenide (ZnSe) and cadmium telluride (CdTe). Any other II-VI, III-V, tertiary, or quaternary semiconductor structures that exhibit a direct band gap may be used as well. In an embodiment, core 602 may also include one or more dopants such as metals, alloys, to provide some examples. Examples of metal dopant may include, but not limited to, zinc (Zn), Copper (Cu), aluminum (Al), platinum (Pt), chrome (Cr), tungsten (W), palladium (Pd), or a combination thereof. The presence of one or more dopants in core 602 may improve structural and optical stability and QY of NS 601 compared to undoped NSs.

Core 602 may have a size of less than 20 nm in diameter, according to an embodiment. In another embodiment, core 602 may have a size between about 1 nm and about 5 nm in diameter. The ability to tailor the size of core 602, and consequently the size of NS 601 in the nanometer range enables photoemission coverage in the entire optical spectrum. In general, the larger NSs emit light towards the red end of the spectrum, while smaller NSs emit light towards the blue end of the spectrum. This effect arises as larger NSs have energy levels that are more closely spaced than the smaller NSs. This allows the NS to absorb photons containing less energy, i.e. those closer to the red end of the spectrum.

Shell 604 surrounds core 602 and is disposed on outer surface of core 602. Shell 604 may include cadmium sulfide (CdS), zinc cadmium sulfide (ZnCdS), zinc selenide sulfide (ZnSeS), and zinc sulfide (ZnS). In an embodiment, shell 604 may have a thickness 604$t$, for example, one or more monolayers. In other embodiments, shell 604 may have a thickness 604$t$ between about 1 nm and about 5 nm. Shell 604 may be utilized to help reduce the lattice mismatch with core 602 and improve the QY of NS 601. Shell 604 may also help to passivate and remove surface trap states, such as dangling bonds, on core 602 to increase QY of NS 601. The presence of surface trap states may provide non-radiative recombination centers and contribute to lowered emission efficiency of NS 601.

In alternate embodiments, NS 601 may include a second shell disposed on shell 604, or more than two shells surrounding core 602, without departing from the spirit and scope of the present invention. In an embodiment, the second shell may be on the order of two monolayers thick and is typically, though not required, also a semiconducting material. Second shell may provide protection to core 602. Second shell material may be zinc sulfide (ZnS), although other materials may be used as well without deviating from the scope or spirit of the invention.

Barrier layer 606 is configured to form a coating on NS 601. In an embodiment, barrier layer 606 is disposed on and in substantial contact with outer surface 604$a$ of shell 604. In embodiments of NS 601 having one or more shells, barrier layer 606 may be disposed on and in substantial contact with the outermost shell of NS 601. In an example embodiment, barrier layer 606 is configured to act as a spacer between NS 601 and one or more NSs in, for example, a solution, a composition, and/or a film having a plurality of NSs, where the plurality of NSs may be similar to NS 601 and/or barrier layer coated NS 600. In such NS solutions, NS compositions, and/or NS films, barrier layer 606 may help to prevent aggregation of NS 601 with adjacent NSs. Aggregation of NS 601 with adjacent NSs may lead to increase in size of NS 601 and consequent reduction or quenching in the optical emission properties of the aggregated NS (not shown) including NS 601. In further embodiments, barrier layer 606 provides protection to NS 601 from, for example, moisture, air, and/or harsh environments (e.g., high temperatures and chemicals used during lithographic processing of NSs and/or during manufacturing process of NS based devices) that may adversely affect the structural and optical properties of NS 601.

Barrier layer 606 includes one or more materials that are amorphous, optically transparent and/or electrically inactive. Suitable barrier layers include inorganic materials, such as, but not limited to, inorganic oxides and/or nitrides. Examples of materials for barrier layer 606 include oxides and/or nitrides of Al, Ba, Ca, Mg, Ni, Si, Ti, or Zr, according to various embodiments. Barrier layer 606 may have a thickness 606$t$ ranging from about 8 nm to about 15 nm in various embodiments.

As illustrated in FIG. 6, barrier layer coated NS 600 may additionally or optionally include a plurality of ligands or surfactants 608, according to an embodiment. Ligands or surfactants 608 may be adsorbed or bound to an outer surface of barrier layer coated NS 600, such as on an outer surface of barrier layer 606, according to an embodiment. The plurality of ligands or surfactants 608 may include hydrophilic or polar heads 608$a$ and hydrophobic or non-polar tails 608$b$. The hydrophilic or polar heads 608$a$ may be bound to barrier layer 606. The presence of ligands or surfactants 608 may help to separate NS 600 and/or NS 601 from other NSs in, for example, a solution, a composition, and/or a film during their formation. If the NSs are allowed to aggregate during their formation, the quantum efficiency of NSs such as NS 600 and/or NS 601 may drop. Ligands or surfactants 608 may also be used to impart certain properties to barrier layer coated NS 600, such as hydrophobicity to provide miscibility in non-polar solvents, or to provide reaction sites (e.g., reverse micellar systems) for other compounds to bind.

A wide variety of ligands exist that may be used as ligands 608. In some embodiments, the ligand is a fatty acid selected from lauric acid, caproic acid, myristic acid, palmitic acid, stearic acid, and oleic acid. In some embodiments, the ligand is an organic phosphine or an organic phosphine oxide selected from trioctylphosphine oxide (TOPO), trioctylphosphine (TOP), diphenylphosphine (DPP), triphenylphosphine oxide, and tributylphosphine oxide. In some embodiments, the ligand is an amine selected from dodecylamine, oleylamine, hexadecylamine, and octadecylamine. In some embodiments, the ligand is trioctylphosphine (TOP). In some embodiments, the ligand is oleylamine. In some embodiments, the ligand is diphenylphosphine.

A wide variety of surfactants exist that may be used as surfactants 608. Nonionic surfactants may be used as surfactants 608 in some embodiments. Some examples of nonionic surfactants include polyoxyethylene (5) nonylphenylether (commercial name IGEPAL CO-520), polyoxyethylene (9) nonylphenylether (IGEPAL CO-630), octylphenoxy poly(ethyleneoxy)ethanol (IGEPAL CA-630), polyethylene glycol oleyl ether (Brij 93), polyethylene glycol hexadecyl ether (Brij 52), polyethylene glycol octadecyl ether (Brij S10), polyoxyethylene (10) isooctylcyclohexyl ether (Triton X-100), and polyoxyethylene branched nonylcyclohexyl ether (Triton N-101).

Anionic surfactants may be used as surfactants 608 in some embodiments. Some examples of anionic surfactants include sodium dioctyl sulfosuccinate, sodium stearate, sodium lauryl sulfate, sodium monododecyl phosphate, sodium dodecylbenzenesulfonate, and sodium myristyl sulfate.

In some embodiments, NSs 601 and/or 600 may be synthesized to emit light in one or more various color ranges, such as red, orange, and/or yellow range. In some embodiments, NSs 601 and/or 600 may be synthesized to emit light in the green and/or yellow range. In some embodiments, NSs 601 and/or 600 may be synthesized emit light in the blue, indigo, violet, and/or ultra-violet range. In some embodiments, NSs 601 and/or 600 may be synthesized to have a primary emission peak wavelength between about 605 nm and about 650 nm, between about 510 nm and about 550 nm, or between about 300 nm and about 480 nm.

NSs 601 and/or 600 may be synthesized to display a high QY. In some embodiments, NSs 601 and/or 600 may be synthesized to display a QY between 80% and 95% or between 85% and 90%.

Thus, according to various embodiments, NSs 600 may be synthesized such that the presence of barrier layer 606 on NSs 601 does not substantially change or quench the optical emission properties of NSs 601.

Example Embodiments of a Nanostructure Film

Figure 7:
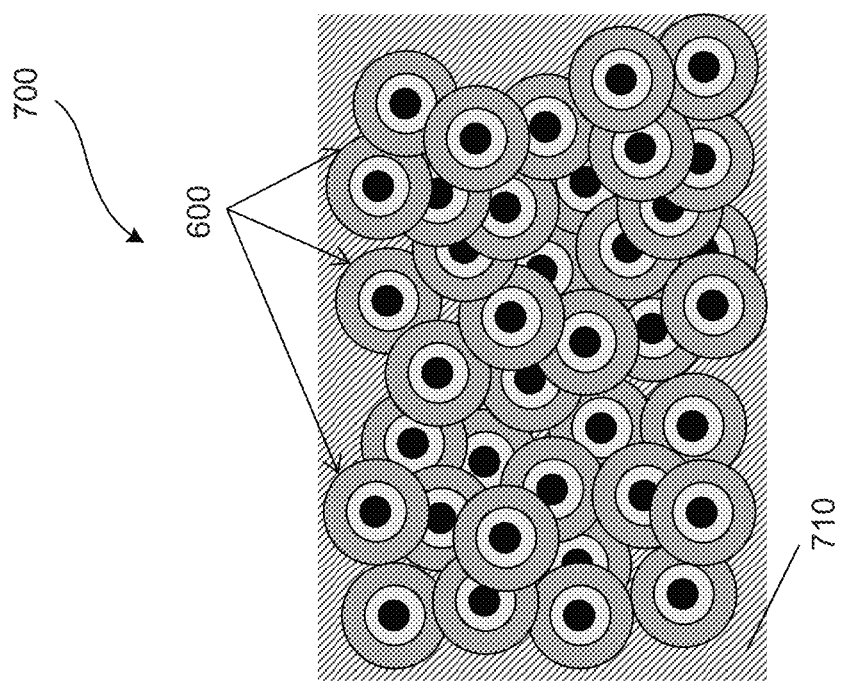
FIG. 7 is a schematic of a nanostructure film, according to an embodiment.

FIG. 7 illustrates a cross-sectional view of a NS film 700, according to an embodiment. In some embodiments, phosphor films 236.1, 236.2, 550, and/or 552 may be similar to NS film 700.

NS film 700 may include a plurality of barrier layer coated core-shell NSs 600 (FIG. 6) and a matrix material 710, according to an embodiment. NSs 600 may be embedded or otherwise disposed in matrix material 710, according to some embodiments. As used herein, the term "embedded" is used to indicate that the NSs are enclosed or encased within matrix material 710 that makes up the majority component of the matrix. It should be noted that NSs 600 may be uniformly distributed throughout matrix material 710 in an embodiment, though in other embodiments NSs 600 may be distributed according to an application-specific uniformity distribution function. It should be noted that even though NSs 600 are shown to have the same size in diameter, a person skilled in the art would understand that NSs 600 may have a size distribution.

In an embodiment, NSs 600 may include a homogenous population of NSs having sizes that emit in the blue visible wavelength spectrum, in the green visible wavelength spectrum, or in the red visible wavelength spectrum. In other embodiments, NSs 600 may include a first population of NSs having sizes that emit in the blue visible wavelength spectrum, a second population of NSs having sizes that emit in the green visible wavelength spectrum, and a third population of NSs that emit in the red visible wavelength spectrum.

Matrix material 710 may be any suitable host matrix material capable of housing NSs 600. Suitable matrix materials may be chemically and optically compatible with NSs 600 and any surrounding packaging materials or layers used in applying NS film 700 to devices. Suitable matrix materials may include non-yellowing optical materials which are transparent to both the primary and secondary light, thereby allowing for both primary and secondary light to transmit through the matrix material. In an embodiment, matrix material 710 may completely surround each of the NSs 600. The matrix material 710 may be flexible in applications where a flexible or moldable NS film 700 is desired. Alternatively, matrix material 710 may include a high-strength, non-flexible material.

Matrix material 710 may include polymers and organic and inorganic oxides. Suitable polymers for use in matrix material 710 may be any polymer known to the ordinarily skilled artisan that can be used for such a purpose. The polymer may be substantially translucent or substantially transparent. Matrix material 710 may include, but not limited to, epoxies, acrylates, norbornene, polyethylene, poly (vinyl butyral):poly(vinyl acetate), polyurea, polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are crosslinked with bifunctional monomers, such as divinylbenzene; cross-linkers suitable for cross-linking ligand materials, epoxides which combine with ligand amines (e.g., APS or PEI ligand amines) to form epoxy, and the like.

In some embodiments, matrix material 710 includes scattering microbeads such as TiO2 microbeads, ZnS microbeads, or glass microbeads that may improve photo conversion efficiency of NS film 700.

In another embodiment, matrix material 710 may have low oxygen and moisture permeability, exhibit high photo- and chemical-stability, exhibit favorable refractive indices, and adhere to outer surfaces of NSs 600, thus providing an air-tight seal to protect NSs 600. In another embodiment, matrix material 710 may be curable with UV or thermal curing methods to facilitate roll-to-roll processing.

According to some embodiments, NS film 700 may be formed by mixing NSs 600 in a polymer (e.g., photoresist) and casting the NS-polymer mixture on a substrate, mixing NSs 600 with monomers and polymerizing them together, mixing NSs 600 in a sol-gel to form an oxide, or any other method known to those skilled in the art.

According to some embodiments, the formation of NS film 700 may include a film extrusion process. The film extrusion process may include forming a homogenous mixture of matrix material 710 and barrier layer coated core-shell NSs such as NS 600, introducing the homogenous mixture into a top mounted hopper that feeds into an extruder. In some embodiments, the homogenous mixture may be in the form of pellets. The film extrusion process may further include extruding NS film 700 from a slot die and passing extruded NS film 700 through chill rolls. In some embodiments, the extruded NS film 700 may have a thickness less than about 75 µm, for example, in a range from about 70 µm to about 40 µm, from about 65 µm to about 40 µm, from about 60 µm to about 40 µm, or form about 50 µm to about 40 µm. In some embodiments, NS film 700 has a thickness less than 10 µm. In some embodiments, the formation of NS film 700 may optionally include a secondary process followed by the film extrusion process. The secondary process may include a process such as co-extrusion, thermoforming, vacuum forming, plasma treatment, molding, and/or embossing to provide a texture to a top surface of NS film 700. The textured top surface NS film 700 may help to improve, for example defined optical diffusion property and/or defined angular optical emission property of NS film 700.

Example Embodiments of Luminescent Nanostructures

Described herein are various compositions having luminescent nanostructures (NSs). The various properties of the luminescent nanostructures, including their absorption properties, emission properties and refractive index properties, may be tailored and adjusted for various applications.

The material properties of NSs may be substantially homogenous, or in certain embodiments, may be heterogeneous. The optical properties of NSs may be determined by their particle size, chemical or surface composition. The ability to tailor the luminescent NS size in the range between about 1 nm and about 15 nm may enable photoemission coverage in the entire optical spectrum to offer great versatility in color rendering. Particle encapsulation may offer robustness against chemical and UV deteriorating agents.

Luminescent NSs, for use in embodiments described herein may be produced using any method known to those skilled in the art. Suitable methods and example nanocrystals are disclosed in U.S. Pat. No. 7,374,807; U.S. patent application Ser. No. 10/796,832, filed Mar. 10, 2004; U.S. Pat. No. 6,949,206; and U.S. Provisional Patent Application No. 60/578,236, filed Jun. 8, 2004, the disclosures of each of which are incorporated by reference herein in their entireties.

Luminescent NSs for use in embodiments described herein may be produced from any suitable material, including an inorganic material, and more suitably an inorganic conductive or semiconductive material. Suitable semiconductor materials may include those disclosed in U.S. patent application Ser. No. 10/796,832, and may include any type of semiconductor, including group II-VI, group III-V, group IV-VI and group IV semiconductors. Suitable semiconductor materials may include, but are not limited to, Si, Ge, Sn, Se, Te, B, C (including diamond), P, BN, BP, BAs, MN, AlP, AlAs, AlSb, GaN, GaP, GaAs, GaSb, InN, InP, InAs, InSb, MN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SuS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and an appropriate combination of two or more such semiconductors.

In certain embodiments, the luminescent NSs may have a dopant from the group consisting of a p-type dopant or an n-type dopant. The NSs may also have II-VI or III-V semiconductors. Examples of II-VI or III-V semiconductor NSs may include any combination of an element from Group II, such as Zn, Cd and Hg, with any element from Group VI, such as S, Se, Te and Po, of the Periodic Table; and any combination of an element from Group III, such as B, Al, Ga, In, and Tl, with any element from Group V, such as N, P, As, Sb and Bi, of the Periodic Table.

The luminescent NSs, described herein may also further include ligands conjugated, cooperated, associated or attached to their surface. Suitable ligands may include any group known to those skilled in the art, including those disclosed in U.S. Pat. No. 8,283,412; U.S. Patent Publication No. 2008/0237540; U.S. Patent Publication No. 2010/0110728; U.S. Pat. Nos. 8,563,133; 7,645,397; 7,374,807; 6,949,206; 7,572,393; and 7,267,875, the disclosures of each of which are incorporated herein by reference. Use of such ligands may enhance the ability of the luminescent NSs to incorporate into various solvents and matrixes, including polymers. Increasing the miscibility (i.e., the ability to be mixed without separation) of the luminescent NSs in various solvents and matrixes may allow them to be distributed throughout a polymeric composition such that the NSs do not aggregate together and therefore do not scatter light. Such ligands are described as "miscibility-enhancing" ligands herein.

In certain embodiments, compositions having luminescent NSs distributed or embedded in a matrix material are provided. Suitable matrix materials may be any material known to the ordinarily skilled artisan, including polymetic materials, organic and inorganic oxides. Compositions described herein may be layers, encapsulants, coatings, sheets or films. It should be understood that in embodiments described herein where reference is made to a layer, polymeric layer, matrix, sheet or film, these terms are used interchangeably, and the embodiment so described is not limited to any one type of composition, but encompasses any matrix material or layer described herein or known in the art.

Down-converting NSs (for example, as disclosed in U.S. Pat. No. 7,374,807) utilize the emission properties of luminescent nanostructures that are tailored to absorb light of a particular wavelength and then emit at a second wavelength, thereby providing enhanced performance and efficiency of active sources (e.g., LEDs).

While any method known to the ordinarily skilled artisan may be used to create luminescent NSs, a solution-phase colloidal method for controlled growth of inorganic nanomaterial phosphors may be used. See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," *J Am. Chem. Soc.* 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," *J Am. Chem. Soc.* 115:8706 (1993), the disclosures of which are incorporated by reference herein in their entireties.

According to an embodiment, CdSe may be used as the NS material, in one example, for visible light down-conversion, due to the relative maturity of the synthesis of this material. Due to the use of a generic surface chemistry, it may also possible to substitute non-cadmium-containing NSs.

In semiconductor NSs, photo-induced emission arises from the band edge states of the NS. The band-edge emission from luminescent NSs competes with radiative and non-radiative decay channels originating from surface electronic states. X. Peng, et al., *J Am. Chem. Soc.* 30:7019-7029 (1997). As a result, the presence of surface defects such as dangling bonds provide non-radiative recombination centers and contribute to lowered emission efficiency. An efficient and permanent method to passivate and remove the surface trap states may be to epitaxially grow an inorganic shell material on the surface of the NS. X. Peng, et al., *J. Am. Chem. Soc.* 30:701 9-7029 (1997). The shell material may be chosen such that the electronic levels are type 1 with respect to the core material (e.g., with a larger bandgap to provide a potential step localizing the electron and hole to the core). As a result, the probability of non-radiative recombination may be reduced.

Core-shell structures may be obtained by adding organometallic precursors containing the shell materials to a reaction mixture containing the core NSs. In this case, rather than a nucleation event followed by growth, the cores act as the nuclei, and the shells may grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and to ensure solubility. A uniform and epitaxially grown shell may be obtained when there is a low lattice mismatch between the two materials.

Example materials for preparing core-shell luminescent NSs may include, but are not limited to, Si, Ge, Sn, Se, Te, B, C (including diamond), P, Co, Au, BN, BP, BAs, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTc, BeS, BcSe, BcTe, MgS, MgSe, GeS, GeSe, GeTe, SnS, SnSe, SnTe, PbO, PbS, Pb Se, PbTe, CuP, CuCl, CuBr, CuI, $Si_3N_4$, $Ge_3N_4$, $Al_2O_3$, $(Al, Ga, In)_2 (S, Se, Te)_3$, AlCO, and shell luminescent NSs for use in the practice of the present invention include, but are not limited to, (represented as Core/Shell), CdSe/ZnS, InP/ZnS, InP/ZnSe, PbSe/PbS, CdSe/CdS, CdTe/CdS, CdTe/ZnS, as well as others.

Luminescent NSs for use in the embodiments described herein may be less than about 100 nm in size, and down to less than about 2 nm in size and invention absorb visible light. As used herein, visible light is electromagnetic radiation with wavelengths between about 380 and about 780 nanometers that is visible to the human eye. Visible light can be separated into the various colors of the spectrum, such as red, orange, yellow, green, blue, indigo and violet. Blue light may comprise light between about 435 nm and about 495 nm, green light may comprise light between about 495 nm and 570 nm and red light may comprise light between about 620 nm and about 750 nm in wavelength.

According to various embodiments, the luminescent NSs may have a size and a composition such that they absorb photons that are in the ultraviolet, near-infrared, and/or infrared spectra. The ultraviolet spectrum may comprise light between about 100 nm to about 400 nm, the near-infrared spectrum may comprise light between about 750 nm to about 100 μm in wavelength, and the infrared spectrum may comprise light between about 750 nm to about 300 μm in wavelength.

While luminescent NSs of other suitable material may be used in the various embodiments described herein, in certain embodiments, the NSs may be ZnS, InAs, CdSe, or any combination thereof to form a population of nanocrystals for use in the embodiments described herein. As discussed above, in further embodiments, the luminescent NSs may be core/shell nanocrystals, such as CdSe/ZnS, InP/ZnSe, CdSe/CdS or InP/ZnS.

Suitable luminescent nanostructures, methods of preparing luminescent nanostructures, including the addition of various solubility-enhancing ligands, can be found in Published U.S. Patent Publication No. 2012/0113672, the disclosure of which is incorporated by reference herein in its entirety.

Example Characteristics of an InP Quantum Dot Film

Figure 8:
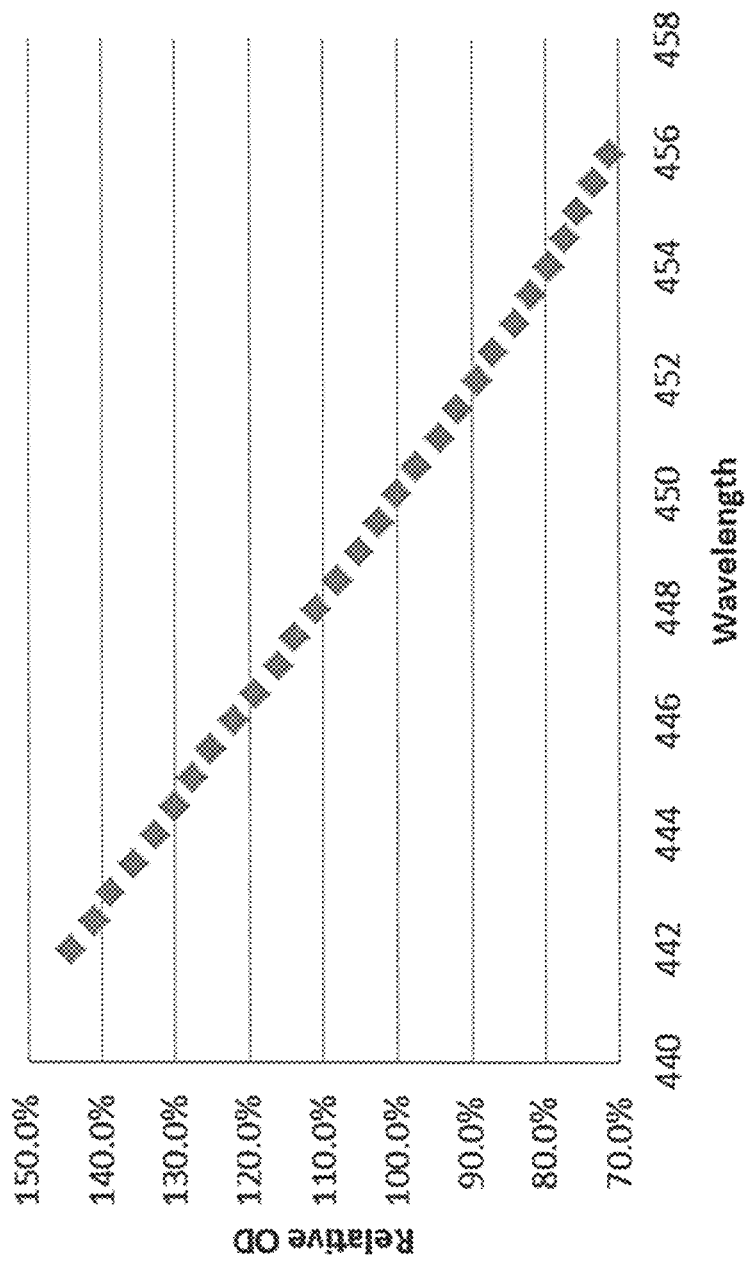
FIG. 8 is a graph showing the relative optical density of a green InP QD.

FIG. 8 shows a plot of relative optical density of a green InP QD film at various wavelengths of a primary light from a blue light source (e.g., LEDs 210, LED 310, OLED 546, micro-LED 546, or QLED 546). The plot shows that the relative optical density increases with decrease in primary light wavelength. That is, the absorption efficiency of the green InP QD film improves with shorter primary light wavelength.

Example Characteristics of a Display Device

Table 1 presents example properties of a display device (e.g., display devices 200, 300, and/or 400) having 450 nm long pass (LP) filters in its blue sub-pixels. The 450 nm LP filters may be an example representative of the one or more non-phosphor films of color processing elements 236.3 and/or 554 described with reference to FIGS. 2-5.

The first column of Table 1 presents primary emission peak wavelengths of primary light provided by blue light sources (e.g., LEDs 210, LED 310, OLED 546, micro-LED 546, or QLED 546).

The second column of Table 1 presents DCI-P3 gamut coverage of a simulated display device, at different primary emission peak wavelengths, obtained without 450 nm long pass (LP) filters in its blue sub-pixels or any optical modification of the primary light entering its blue sub-pixels as described above with reference to blue sub-pixels 226.3 and/or 544 and their respective color processing elements 236.3 and/or 554.

The third column of Table 1 presents DCI-P3 gamut coverage of the display device, at different primary emission peak wavelengths, having the 450 nm long pass filters in its blue sub-pixels for optical modification of the primary light entering its blue sub-pixels as described above with reference to blue sub-pixels 226.3 and/or 544 and their respective color processing elements 236.3 and/or 554.

The fourth and fifth columns of Table 1 present respective x and y coordinates of the white point values of the display device obtained at different primary emission peak wavelengths, where x and y are the Cartesian coordinates of the CIE 1931 color space.

One aspect of display devices using color conversion layers and equal sized sub-pixels is that the amount of blue light transmitted through the blue sub-pixel is much larger than the amount of green and red light generated in the green and red sub-pixels. Thus, the white point of the display would have much lower x and y values than a typical, proper white point (D65, or x=0.313 and y=0.329). Increasing the x and y values can be achieved by attenuating the blue light. The x and y values in Table 1 show that the 450 nm LP filter allows for enough blue light to be transmitted for a proper display white point even for primary emission peak wavelengths down to 442 nm.

Comparison between the color gamut coverages of the second and third columns of Table 1 indicates that the optical modification of the primary light entering the blue sub-pixels helps to improve the color gamut coverage of the display device at shorter primary emission peak wavelengths which may be required for desired absorption efficiency of phosphor films in red and green sub-pixels of the display device.

the CIE 1931 color space. As with the 450 nm LP filter, the Exciton ABS430 absorbing dye also allows enough blue light to be transmitted for a proper display white point even for primary emission peak wavelengths down to 442 nm.

Comparison between the color gamut coverages of the second and third columns Table 2 indicates again that the optical modification of the primary light entering the blue sub-pixels helps to improve the color gamut coverage of the display device at shorter primary emission peak wavelengths which may be required for desired absorption efficiency of phosphor films in red and green sub-pixels of the display device.

TABLE 1

| Primary Emission Peak Wavelength | DCI-P3 Gamut Coverage of a Simulated Display Device | DCI-P3 Gamut Coverage of a Display Device having 450 nm LP Filters | CIE x | CIE y |
| --- | --- | --- | --- | --- |
| 456 | 100.0% | 100.0% | 0.228 | 0.206 |
| 454 | 99.1% | 100.0% | 0.233 | 0.211 |
| 452 | 98.3% | 100.0% | 0.239 | 0.221 |
| 450 | 97.5% | 100.0% | 0.247 | 0.234 |
| 448 | 96.8% | 100.0% | 0.256 | 0.251 |
| 446 | 96.2% | 100.0% | 0.267 | 0.271 |
| 444 | 95.6% | 100.0% | 0.279 | 0.293 |
| 442 | 95.1% | 100.0% | 0.291 | 0.315 |

Table 2 presents example properties of another display device (e.g., display devices 200, 300, and/or 400) having films of absorbing dye Exciton ABS430 in its blue sub-pixels. The films of absorbing dye Exciton ABS430 may be an example representative of the one or more non-phosphor films of color processing elements 236.3 and/or 554 described with reference to FIGS. 2-5.

The first and second columns of Table 2 are similar to the first and second columns of Table 1.

The third column of Table 2 presents DCI-P3 gamut coverage of the another display device, at different primary emission peak wavelengths, having the films of absorbing dye Exciton ABS430 in its blue sub-pixels for optical modification of the primary light entering its blue sub-pixels as described above with reference to blue sub-pixels 226.3 and/or 544 and their respective color processing elements 236.3 and/or 554.

The fourth and fifth columns of Table 2 present respective x and y coordinates of the white point values of the another display device obtained at different primary emission peak wavelengths, where x and y are the Cartesian coordinates of

TABLE 2

| Primary Emission Peak Wavelength | DCI-P3 Gamut Coverage of a Simulated Display Device | DCI-P3 Gamut Coverage of a Display Device having Films of Exciton ABS430 | CIE x | CIE y |
| --- | --- | --- | --- | --- |
| 456 | 100.0% | 100.0% | 0.256 | 0.266 |
| 454 | 99.1% | 100.0% | 0.263 | 0.275 |
| 452 | 98.3% | 100.0% | 0.270 | 0.285 |
| 450 | 97.5% | 100.0% | 0.277 | 0.295 |
| 448 | 96.8% | 100.0% | 0.284 | 0.304 |
| 446 | 96.2% | 99.5% | 0.289 | 0.310 |
| 444 | 95.6% | 98.5% | 0.293 | 0.314 |
| 442 | 95.1% | 97.3% | 0.295 | 0.314 |

It is to be understood that while certain embodiments have been illustrated and described herein, the claims are not to be limited to the specific forms or arrangement of parts described and shown. In the specification, there have been disclosed illustrative embodiments and, although specific terms are employed, they are used in a generic and descriptive sense only and not for purposes of limitation. Modifications and variations of the embodiments are possible in light of the above teachings. It is therefore to be understood that the embodiments may be practiced otherwise than as specifically described.

What is claimed is:
1. A display device comprising:
  a light source configured to emit a first light having a first peak wavelength; and
  a liquid crystal display (LCD) module comprising:
    a first sub-pixel comprising a phosphor film configured to receive a first portion of the first light and to emit a second light having a second peak wavelength that is different from the first peak wavelength; and a second sub-pixel comprising a non-phosphor film configured to receive a second portion of the first light and to transmit a third light having a third peak wavelength that is different from the first peak wavelength, wherein the non-phosphor film comprises color filtering properties to filter the second portion of the first light to thereby shift the first peak wavelength to the third peak wavelength, and wherein the first and third peak wavelengths are in a blue wavelength spectrum of a visible spectrum.

2. The display device of claim 1, wherein the non-phosphor film is configured to shift the first peak wavelength of the second portion of the first light to the third peak wavelength of the third light.

3. The display device of claim 1, wherein the non-phosphor film is configured to attenuate a first optical intensity of the second portion of the first light to transmit the third light with a second optical intensity lower than the first optical intensity.

4. The display device of claim 1, wherein the first peak wavelength is shorter than the second peak wavelength or the third peak wavelength and the third peak wavelength is shorter than the second peak wavelength.

5. The display device of claim 1, wherein the first peak wavelength is between about 450 nm and about 440 nm and the third peak wavelength is between about 460 nm and about 450 nm.

6. The display device of claim 1, wherein the non-phosphor film does not contain luminescent nanostructures.

7. The display device of claim 1, wherein the non-phosphor film comprises a dye, ink, paint, or polymeric material.

8. The display device of claim 1, wherein the non-phosphor film comprises scattering particles comprising titanium oxide, zinc oxide, zinc sulfide, silicone, or a combination thereof.

9. The display device of claim 1, wherein the phosphor film comprises a population of luminescent nanostructures configured to emit red or green light.

10. A display device comprising:
a first light source comprising a first organic light emitting diode (OLED), a first micro-LED, or a first quantum dot LED (QLED) configured to emit a first light having a first peak wavelength;
a phosphor film configured to receive the first light and to emit a second light having a second peak wavelength that is different from the first peak wavelength;
a second light source comprising a second OLED, a second micro-LED, or a second QLED configured to emit a third light having a third peak wavelength; and
a non-phosphor film configured to receive the third light and to transmit a fourth light having a fourth peak wavelength that is different from the third peak wavelength, wherein the non-phosphor film comprises color filtering properties to filter the third light to thereby shift a peak wavelength from the third peak wavelength to the fourth peak wavelength.

11. The display device of claim 10, wherein the non-phosphor film is configured to attenuate a first optical intensity of the third light to transmit the fourth light with a second optical intensity lower than the first optical intensity.

12. The display device of claim 10, wherein the phosphor film is positioned on the first light source and the non-phosphor film is positioned on the second light source.

13. The display device of claim 10, wherein the third and fourth peak wavelengths are in a blue wavelength region of a visible spectrum.

14. The display device of claim 10, wherein a relative optical density of the phosphor film is between about 85% and about 140% at the first peak wavelength compared with an optical density at 450 nm.

15. A display device comprising:
a light source configured to emit a first light having a first peak wavelength in a blue wavelength region of a visible spectrum;
a quantum dot film, positioned on the light source, configured to emit a second light having a second peak wavelength that is different from the first peak wavelength and is in a red or green wavelength region of the visible spectrum; and
a non-phosphor film, positioned on the array of light sources, configured to transmit a third light having a third peak wavelength that is different from the first peak wavelength and is in a blue wavelength region of the visible spectrum, wherein the non-phosphor film comprises color filtering properties to filter a portion of the first light to thereby shift the first peak wavelength to the third peak wavelength.

16. The display device of claim 15, wherein the non-phosphor film comprises a dye, ink, paint, or polymeric material and does not contain luminescent nano structures.

17. The display device of claim 15, wherein the first peak wavelength is shorter than the third peak wavelength.

* * * * *